United States Patent
Forrer, Jr. et al.

(10) Patent No.: US 7,191,286 B2
(45) Date of Patent: Mar. 13, 2007

(54) DATA REDUNDANCY IN INDIVIDUAL HARD DRIVES

(75) Inventors: Thomas R. Forrer, Jr., Round Rock, TX (US); Jason Eric Moore, Austin, TX (US); Abel Enrique Zuzuarregui, Paige, TX (US)

(73) Assignee: International Business Machines Corporation, Armonk, NY (US)

( * ) Notice: Subject to any disclaimer, the term of this patent is extended or adjusted under 35 U.S.C. 154(b) by 366 days.

(21) Appl. No.: 10/809,589

(22) Filed: Mar. 25, 2004

(65) Prior Publication Data

US 2005/0216657 A1    Sep. 29, 2005

(51) Int. Cl.
*F06F 12/00* (2006.01)

(52) U.S. Cl. .................. 711/114; 711/112; 711/150

(58) Field of Classification Search ............... None
See application file for complete search history.

(56) References Cited

U.S. PATENT DOCUMENTS

| 6,028,725 A | * | 2/2000 | Blumenau | 360/8 |
| 2004/0179386 A1 | * | 9/2004 | Jun | 365/145 |

* cited by examiner

*Primary Examiner*—Reginald Bragdon
*Assistant Examiner*—Shawn Gu
(74) *Attorney, Agent, or Firm*—Duke W. Yee; Diana R. Gerhardt; James O. Skarsten

(57) ABSTRACT

A method and system are disclosed for recovering lost data with redundancy in an individual hard drive. A mirroring-type process is used in a single hard drive to maintain a backup copy of all data stored on that hard drive. The hard drive maintains two copies of the stored data on different storage media segments or partitions defined by separate read/write heads. In the event that a hard drive media defect or error occurs with respect to any of the data stored on a segment defined by one head, that data can be restored from the segment defined by the other head(s).

19 Claims, 2 Drawing Sheets

DATA REDUNDANCY IN INDIVIDUAL HARD DRIVES

BACKGROUND OF THE INVENTION

1. Technical Field

The present invention relates generally to data recovery in computer systems. More specifically, the present invention provides an improved method and system with redundancy for recovering lost data in individual hard drives.

2. Description of Related Art

Hard disk drives ("hard drives") are the main data storage devices for most computers or processors. Typical hard drives contain a number of hard disk platters ("disks") coated with magnetic material for storing data in magnetized form. The disks are affixed to a spindle that spins them in unison at a constant rate. An actuator arm moves one or more read/write heads radially across the disks to retrieve or store the magnetized data. The hard drive's components (disks, spindle, actuator arm, read/write heads, associated motors and electronics, etc.) are enclosed within a head disk assembly (HDA).

The HDA protects the hard drive's components from contamination by dust, condensation, and other sources. Contamination of a hard drive's disk or read/write head can result in disk failure, head crash and/or an unrecoverable loss of data. Also, data loss can be caused by other hard drive problems, such as electronic malfunctions, physical shocks, worn out components, improperly manufactured disks, etc.

Notably, unrecoverable data error rates for the existing generation of hard drives have remained essentially unchanged for the past 10 years. However, the storage capacity of hard drives has increased at a substantial rate (e.g., doubling on average every 18 months). In fact, the typical storage capacity of the existing generation of hard drives ranges from about 8 GB to 300 GB (up from about 20 MB just a few years ago). Consequently, the probability that unrecoverable data errors ("hard errors") can occur during hard drive read/write operations has increased significantly along with the substantial increase in storage capacity.

One hardware approach to solving the problem of increased hard errors in hard drives is Redundant Arrays of Independent Disks (RAID). The RAID approach connects a plurality of hard drives together and treats them as a single, logical unit. Consequently, a computer sees the plurality of drives as one, large hard drive that can be formatted and partitioned similar to that of a smaller, individual drive. The redundancy thus provided by the multiple hard drives of the RAID approach enhances the recovery of lost data due to hard errors, and also increases the performance of the computer system involved. As such, the multiple hard drive RAID approach provides an acceptable solution for large, desk-side computers and server applications. However, the use of multiple hard drives for redundancy is unsuitable for those relatively small computer systems or products where the primary design considerations are to minimize space, weight and cost.

Therefore, it would be advantageous to have an improved method and system for recovering lost data with redundancy in an individual hard drive.

SUMMARY OF THE INVENTION

The present invention provides a method and system for recovering lost data with redundancy in an individual hard drive. A mirroring-type process is used in a single hard drive to maintain a backup copy of all data stored on that hard drive. The hard drive maintains two copies of the stored data on different storage media segments or partitions defined by separate read/write heads. In the event that a hard drive media defect or error occurs with respect to any of the data stored on a segment defined by one head, that data can be restored from the segment defined by the other head(s).

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
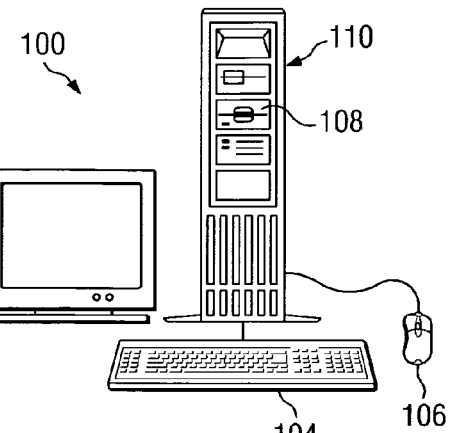
FIG. 1 is a pictorial representation depicting a data processing system in which the present invention may be implemented in accordance with a preferred embodiment of the present invention.

With reference now to the figures, FIG. 1 depicts a pictorial representation of a data processing system in which the present invention may be implemented, in accordance with a preferred embodiment of the present invention. For this exemplary embodiment, data processing system ("computer") 100 includes system unit 110, video display terminal 102, keyboard 104, mouse 106, and storage devices 108, which may include one or more floppy drives, a hard drive, a CD-ROM drive, and/or other types of permanent and removable storage media. Additional input devices may be included with computer 100, such as, for example, a joystick, touch pad, touch screen, trackball, microphone, and the like.

Computer 100 can be implemented using any suitable computer, such as, for example, an IBM RISC/System 6000 computer system or IntelliStation computer, which are products of International Business Machines Corporation in Armonk, N.Y. Although the depicted representation shows a computer, other embodiments of the present invention may be implemented in other types of data processing systems, such as a network computer, and the like. In any event, FIG. 1 is intended as an example and not as an architectural limitation for the present invention.

Figure 2A:
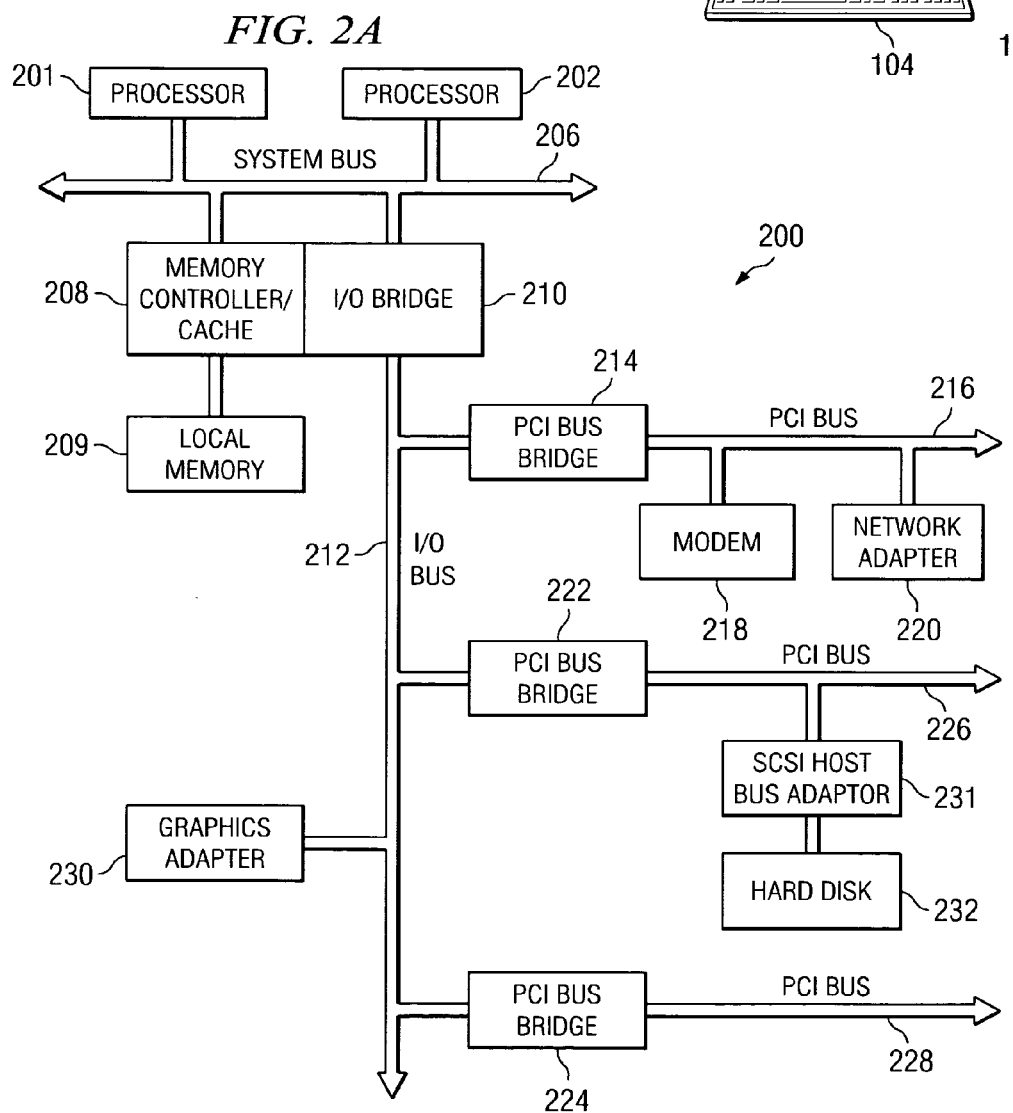
FIG. 2A is an example block diagram illustrating hierarchically organized internal components of a server-type data processing system that may be used to implement the present invention.

With reference now to FIG. 2A, a block diagram is shown that depicts hierarchically organized internal components of a server-type data processing system, which may be used to implement the present invention. For this exemplary embodiment, data processing system 200 may be a symmetric multiprocessor (SMP) system including a plurality of processors 201–202 connected to system bus 206. Processors 201–203 may be any suitable processor, such as a processor selected from the PowerPC™ family of processors. Memory controller/cache 208, which provides an interface to local memory 209, is also connected to system bus 206. I/O Bus Bridge 210 is connected to system bus 206 and provides an interface to I/O bus 212. Memory controller/cache 208 and I/O Bus Bridge 210 may be separate components or integrated as depicted.

Peripheral component interconnect (PCI) bus bridge 214 connected to I/O bus 212 provides an interface to PCI local bus 216. Modem 218 and network adapter 220 may be connected to PCI local bus 216. Typical PCI bus implementations will support four PCI expansion slots or add-in connectors.

Additional PCI bus bridges 222 and 224 provide interfaces for additional PCI buses 226 and 228, from which additional modems or network adapters may be supported. Memory-mapped graphics adapter 230 may also be connected to I/O bus 212 as depicted, either directly or indirectly. Hard disk 232 may be connected to Small Computer System Interface (SCSI) Host Bus Adapter 231, which is connected to PCI bus 226.

Figure 2B:
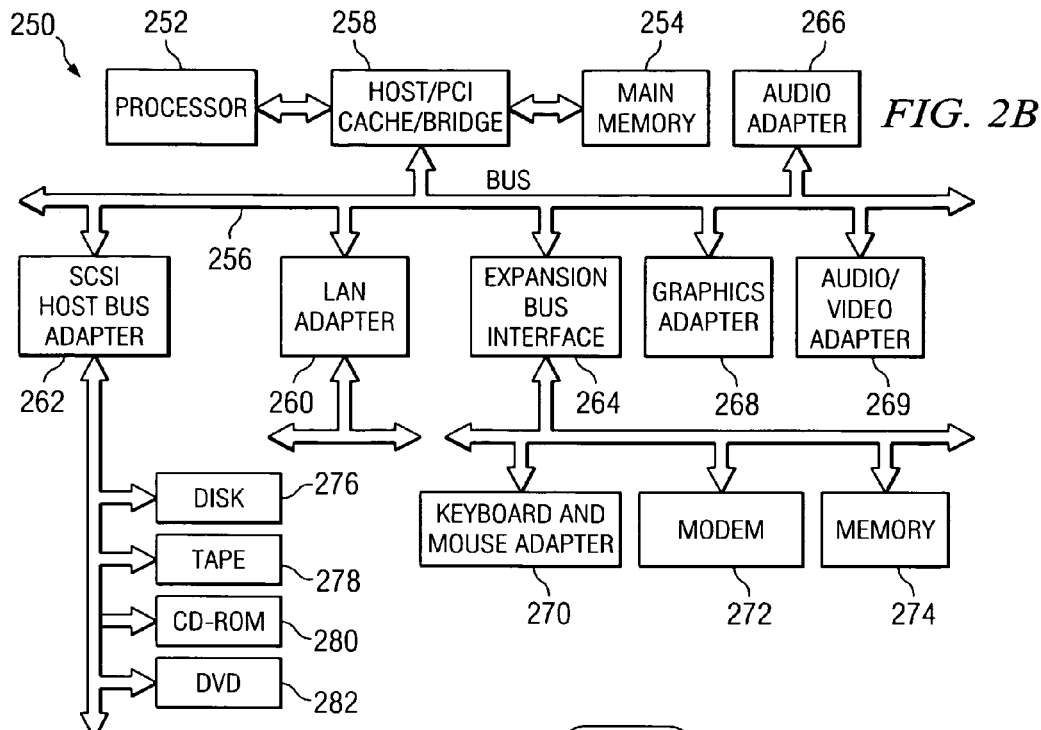
FIG. 2B is an example block diagram illustrating hierarchically organized internal components of a client-type data processing system that may be used to implement the present invention.

With reference now to FIG. 2B, a block diagram is shown that depicts hierarchically organized internal components of a client-type data processing system, which may be used to implement the present invention. For this exemplary embodiment, data processing system 250 employs a PCI local bus architecture. Although the depicted example employs a PCI bus, other bus architectures such as Micro Channel and ISA may be used. Processor 252 and main memory 254 are connected to PCI local bus 256 through PCI Bridge 258. PCI Bridge 258 also may include an integrated memory controller and cache memory for processor 252. Additional connections to PCI local bus 256 may be made through direct component interconnection or through add-in boards. In the depicted example, Local Area Network (LAN) adapter 260, SCSI host bus adapter 262, and expansion bus interface 264 are connected to PCI local bus 256 by direct component connection. In contrast, audio adapter 266, graphics adapter 268, and audio/video adapter (A/V) 269 are connected to PCI local bus 266 by add-in boards inserted into expansion slots. Expansion bus interface 264 provides a connection for keyboard and mouse adapter 270, modem 272, and additional memory 274. SCSI host bus adapter 262 provides a connection for hard disk drive 276, tape drive 278, CD-ROM 280 and DVD drive 282 in the depicted example. Typical PCI local bus implementations will support three or four PCI expansion slots or add-in connectors.

An Operating System (OS) runs on processor 252 and is used to coordinate and provide control of various components within data processing system 250 in FIG. 2B. Instructions for an OS and applications or programs are located on storage devices, such as hard disk drive 276 and may be loaded into main memory 254 for execution by processor 252. Hard disk drives may be absent and memory may be constrained when data processing system 250 is used as a network client.

Those of ordinary skill in the art will appreciate that the hardware in FIG. 2A or FIG. 2B may vary depending on the implementation. For example, other peripheral devices may be used in addition to or in place of the hardware depicted in FIG. 2B. The depicted examples are not meant to imply architectural limitations with respect to the present invention.

Essentially, in accordance with a preferred embodiment of the present invention, a mirroring-type process is used in a single hard drive to maintain a backup copy of all data stored on that hard drive. The hard drive maintains two copies of the stored data on different storage media segments or partitions defined by separate read/write heads. In the event that a hard drive media defect or error occurs with respect to any of the data stored on a segment defined by one head, that data can be restored from the segment defined by the other head(s). As such, for this exemplary embodiment, the hard drive is responsible for maintaining the mirroring functionality for the separate heads. The typical excess capacity provided by the existing hard drive technologies allows the mirroring-type process to be used in individual drives without exceeding their capacity or degrading performance.

Figure 3:
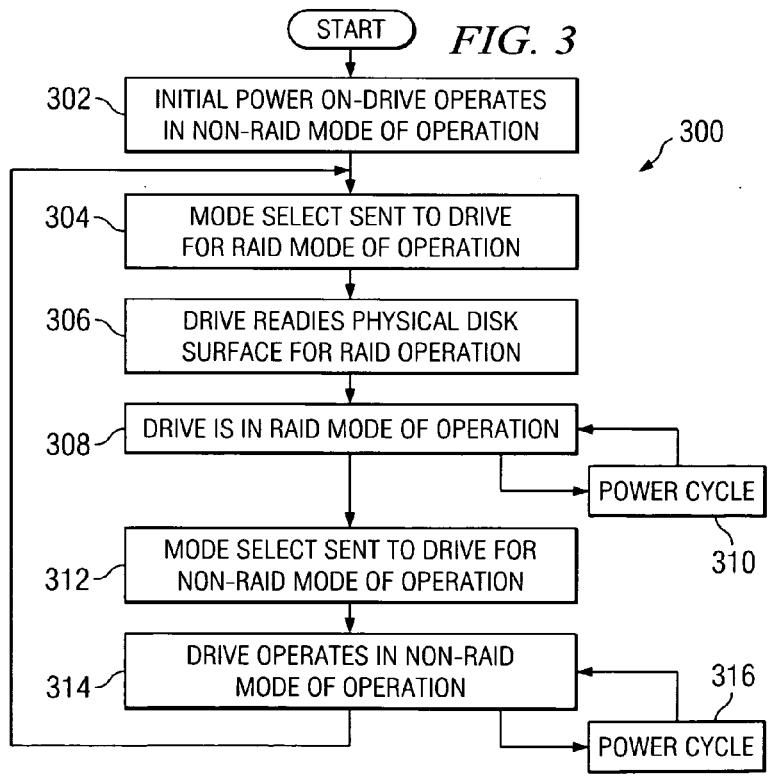
FIG. 3 is an example flowchart illustrating a process for recovering lost data with redundancy in an individual hard drive, which can be implemented in accordance with a preferred embodiment of the present invention.

With reference now to FIG. 3, a flowchart depicting a process for recovering lost data with redundancy in an individual hard drive is shown, which can be implemented in accordance with a preferred embodiment of the present invention. For this exemplary embodiment, the process is preferably implemented in a SCSI hard drive, such as, for example, hard disk drive 232 in FIG. 2A or hard disk drive 276 in FIG. 2B. However, the present invention is not intended to be so limited and can be implemented in any suitable individual hard drive. In any event, the depicted example is not meant to imply an architectural limitation with respect to the present invention.

Essentially, for this exemplary embodiment, process 300 provides a RAID-type mirroring functionality for an individual hard drive (e.g., SCSI hard disk drive 232 or 276), and makes that hard drive responsible for performing all RAID functions by partitioning data on the physical surfaces of the disk(s) involved. Advantageously, the host system (e.g., OS running on processor 201, 202 or 252) is not required to modify any standard read/write commands in order for the host system to read or write data from or to the RAID array on the hard drive involved. A RAID Mode Select command is used to set the hard drive to a desired RAID level (e.g., RAID level 1, 3 or 5). Once the hard drive is set to the desired RAID level and formatted, no additional RAID setup procedure or maintenance is required. The Mode Select command is used to change the hard drivers operational characteristics between its normal (non-RAID) operations and RAID operations.

Referring now to FIG. 3, process 300 begins by the initial powering up of a hard drive (e.g., SCSI hard disk drive 232 in FIG. 2A or SCSI hard disk drive 276 in FIG. 2B) in a normal or non-RAID mode of operation (step 302). For example, the hard drive can be operating in a non-RAID (normal) mode or a RAID 0 mode of operation. Essentially, a RAID 0 mode implements a striped array, in which the data is broken down into blocks and each block is written to a separate read/write head. Thus, the RAID 0 mode is not a "true" RAID or redundancy type of operation.

Next, for this exemplary embodiment, in order to provide data redundancy in an individual hard drive (e.g., SCSI hard disk drive 232 or 276), a unique Mode Select command can be sent to the hard drive involved (step 304). For example, Table 1 shown below illustrates an exemplary format for a Mode Select command that can be used to provide redundancy (and/or parity) for an individual hard drive, in accordance with a preferred embodiment of the present invention.

TABLE 1

Mode Select Command for RAID Page.

| Byte | Bit | | | | | | | |
|---|---|---|---|---|---|---|---|---|
| | 7 | 6 | 5 | 4 | 3 | 2 | 1 | 0 |
| 0 | PS | 0 | | Page Code | | | | |
| 1 | Page Length | | | | | | | |
| 2 | Redundancy Mode | | | | | | | |
| 3 | Stripe Size | | | | | | | |
| 4 | Reserved | | | | | | | |
| 5 | Reserved | | | | | | | |
| 6 | Reserved | | | | | | | |

In general, a Mode Select command is one of a number of SCSI operational Mode commands described in the known American National Standards Institute (ANSI) SCSI Primary Commands (SPC) documents. As illustrated by the Mode Select command presented in Table 1, a new Mode Page (referred to herein as a "RAID Page") can be defined as shown.

Referring to the example Mode Select command (e.g., defining a "RAID Page") shown in Table 1, the ANSI SCSI Committee can assign the parameters to be used for the Page Code field. The Page Length field can be used to define the number of bytes remaining on the specific page involved. For this exemplary embodiment using a SCSI hard disk drive, the number of bytes remaining on this page can be (05)h. The Redundancy Mode field can be used to describe the type of redundancy to be used (e.g., RAID 0, 1, 3 or 5). For this exemplary embodiment, the type of redundancy to be used is preferably RAID-type mirroring or a RAID 1 mode. However, the type of fault tolerance desired can also be provided with a RAID 3 or RAID 5 mode.

The Stripe Size field can be used to define the length of each data block stored. This parameter can be defined in increments of Logical Block Addresses (LBA's). For example, an LBA represents the minimum granularity of data that can be read from or written to the disk drive involved. The Reserved fields can be used for parameters that are unique to specific implementations of this redundant drive functionality.

In response to receiving the "RAID Page" Mode Select command, the hard drive involved prepares the physical disk surface for the RAID operation defined by the Mode Select command (step 306), and formats the data storage segment according to predefined user and/or operational requirements. For example, the Mode Select command can include a parameter representing a RAID 1 mode of operation in the Redundancy Mode field. Once the hard drive completes the physical disk surface preparation and formatting for the requested mode of operation (e.g., RAID 1), the hard drive begins to operate in the requested mode of operation (step 308). For this embodiment, the hard drive can operate continuously with redundancy in a mirroring or RAID 1 mode type of operation (step 310).

As an example of a hard drive configuration for a mirroring or RAID 1 mode type of operation, which can be implemented in accordance with a preferred embodiment of the present invention, during a physical disk surface preparation operation (e.g., step 306) responsive to receipt of a Mode Select command in the form of a RAID Page (e.g., step 304) requesting, for example, a RAID 1 type mode of operation, the controller for the hard drive involved (e.g., controller for SCSI hard disk drive 232 or 276) can partition or segment the physical disk surface of the hard drive into two, separate data storage areas. One of the data storage areas or segments can be defined and reserved for read/write operations using one read/write head of the hard disk drive involved. The second data storage area or segment can be defined for read/write operations using a second read/write head of the hard disk drive involved. Therefore, the controller for the hard disk drive can perform two non-concurrent, separate reads per mirrored pair of read/write heads, or two duplicate writes per mirrored pair of read/write heads. In this manner, the controller can be set to automatically send two exact duplicates of the data to the two storage areas or segments via the two, separate read/write heads. If a data error or disk failure occurs with respect to one of the storage areas or segments, the lost data can be restored by a read operation using the second read/write head and the duplicate copy of the data stored on the second storage segment.

In order to change the hard drive's mode of operation from a RAID mode to a non-RAID mode, a Mode Select command in the form of a RAID Page can be sent to the controller for the hard disk drive involved (step 312). In this case, for example, the RAID Page can request a RAID 0 mode of operation, and the controller can view the hard drive as a single, non-segmented data storage area and can perform read/write operations with any read/write head to any section of the entire hard drive available for data storage (step 314). For this embodiment, the hard drive can then operate continuously without redundancy in a non-mirroring, non-RAID or "normal" mode of operation (step 316).

Notably, for this exemplary embodiment, a SCSI RAID controller can be used for controlling the hard drive involved. However, the present invention is not intended to be so limited, and any suitable type of hard disk drive controller that can perform a mirroring or similar RAID-type function for improved data redundancy and/or fault tolerance can be used.

For example, with improved fault tolerance as a goal, a RAID Page requesting a RAID 3 mode of operation (e.g., parallel data transfer with parity), or RAID 5 mode of operation (e.g., independent data disk segments with distributed parity blocks), can be sent to, and acted upon by, the hard disk drive, the controller, or the RAID controller involved. For these two exemplary cases (RAID 3, 5), parity can be used to improve fault tolerance for a hard drive, because the data can be written sequentially to each read/write head defining each of the separate data storage segments or partitions of the hard drive. A third read/write head can be used with a third segment or partition for storing the parity information. In this case, the data to be stored can be written sequentially to each of two read/write heads, but not to a third one. The third read/write head can be used to store (in a defined data storage segment or partition) a number that represents the Exclusive OR (XOR) of the data stored on the other two segments. This number can be used for typical error checking and correction (ECC) purposes, such as the performance of functions to ensure that read or write operations have conveyed all of the data from or to the hard drive without errors. If such errors in data transfer occur, then the questionable read or write operation can be re-performed.

It is important to note that while the present invention has been described in the context of a fully functioning data processing system, those of ordinary skill in the art will appreciate that the processes of the present invention are capable of being distributed in the form of a computer-readable medium of instructions and a variety of forms and that the present invention applies equally regardless of the particular type of signal bearing media actually used to carry out the distribution. Examples of computer-readable media include recordable-type media, such as a floppy disk, a hard disk drive, a RAM, CD-ROMS, DVD-ROMs, and transmission-type media, such as digital and analog communications links, wired or wireless communications links using transmission forms, such as, for example, radio frequency and light wave transmissions. The computer-readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for redundant data storage on an individual hard drive, comprising the steps of:
   defining at least two data storage segments on said individual hard drive;
   associating a first read/write head with a first data storage segment of said at least two data storage segments;
   associating a second read/write head with a second data storage segment of said at least two data storage segments;
   said defining and associating steps are performed in response to receipt of a software mode select command that has a format comprising multiple parameter selection fields, and is used to set the hard drive to a Redundant Array of Independent Disks (RAID) level selected from any one of multiple RAID levels;
   responsive to a write operation for storing a predefined set of data on said individual hard drive, storing said predefined set of data on said first data storage segment with said first read/write head, and storing said predefined set of data on said second data storage segment with said second read/write head; and
   using a third read/write head associated with a third storage segment on said individual storage hard drive to store parity information pertaining to data stored on said first and second data storage segments.

2. The method of claim 1, wherein one of said multiple parameter selection fields of the mode select command is used to specify said RAID level selected from any one of said multiple RAID levels.

3. The method of claim 1, wherein the defining and associating steps are performed by said individual hard drive responsive to receipt of a RAID Page including a RAID 1 mode selection.

4. The method of claim 1, wherein the defining and associating steps are performed by said individual hard drive responsive to receipt of a RAID Page including a RAID 3 mode selection.

5. The method of claim 1, wherein the defining and associating steps are performed by a controller associated with said individual hard drive.

6. The method of claim 1, wherein the defining and associating steps are performed by a RAID controller associated with said individual hard drive.

7. A system for redundant data storage on an individual hard drive, comprising:
   means for defining at least two data storage segments on said individual hard drive;
   means for associating a first read/write head with a first data storage segment of said at least two data storage segments;
   means for associating a second read/write head with a second data storage segment of said at least two data storage segments;
   said defining and associating functions being performed in response to receipt of a software mode select command that has a format comprising multiple parameter selection fields, and is used to set the hard drive to a Redundant Array of Independent Disks (RAID) level selected from any one of multiple RAID levels;
   means for storing a predefined set of data on said first data storage segment with said first read/write head, and storing said predefined set of data on said second data storage segment with said second read/write head, responsive to a write operation for storing said predefined set of data on said individual hard drive;
   means for associating a third read/write head associated with a third storage segment on said individual storage hard drive to store parity information pertaining to data stored on said first and second data storage segments.

8. The system of claim 7, wherein one of said multiple parameter selection fields of the mode select command is used to specify said Redundant Array of Independent Disks (RAID) level selected from any one of said multiple RAID levels.

9. The system of claim 7, wherein the defining and associating functions are performed by said individual hard drive responsive to receipt of a RAID Page.

10. The system of claim 7, wherein the defining and associating functions are performed by said individual hard drive responsive to receipt of a RAID Page including a RAID 1 mode selection.

11. The system of claim 7, wherein the defining and associating functions are performed by said individual hard drive responsive to receipt of a RAID Page including a RAID 3 mode selection.

12. The system of claim 7, wherein the defining and associating functions are performed by a controller associated with said individual hard drive.

13. The system of claim 7, wherein the defining and associating functions are performed by a RAID controller associated with said individual hard drive.

14. A computer program product on a storage medium for redundant data storage on an individual hard drive, said computer program product comprising:
   first instructions for defining at least two data storage segments on said individual hard drive;
   second instructions for associating a first read/write head with a first data storage segment of said at least two data storage segments;
   third instructions for associating a second read/write head with a second data storage segment of said at least two data storage segments;
   said defining and associating instructions being performed in response to receipt of a software mode select command that has a format comprising multiple parameter selection fields, and is used to set the hard drive to a Redundant Array of Independent Disks (RAID) level selected from any one of multiple RAID levels;
   fourth instructions for storing a predefined set of data on said first data storage segment with said first read/write head, and storing said predefined set of data on said second data storage segment with said second read/write head, responsive to fifth instructions for storing said predefined set of data on said individual hard drive; and fifth instruction for associating a third read/write head associated with a third storage segment on said individual storage hard drive to store parity information pertaining to data stored on said first and second data storage segments.

15. The computer program product of claim 14, wherein one of said multiple parameter selection fields of the mode select command is used to specify said Redundant Array of Independent Disks (RAID) level selected from any one of said multiple RAID levels.

16. The computer program product of claim 14, wherein the first, second and third instructions are performed by said individual hard drive responsive to receipt of a RAID Page.

17. The computer program product of claim 14, wherein the first, second and third instructions are performed by said individual hard drive responsive to receipt of a RAID Page including a RAID 1 mode selection.

18. The computer program product of claim 14, wherein the first, second and third instructions are performed by said individual hard drive responsive to receipt of a RAID Page including a RAID 3 mode selection.

19. The computer program product of claim 14, wherein the first, second and third instructions are performed by a controller associated with said individual hard drive.

* * * * *